US008583424B2

(12) United States Patent
Jaillet et al.

(10) Patent No.: US 8,583,424 B2
(45) Date of Patent: Nov. 12, 2013

(54) SPATIAL SYNTHESIS OF MULTICHANNEL AUDIO SIGNALS

(75) Inventors: Florent Jaillet, Chateau-Arnoux (FR); David Virette, Munich (DE)

(73) Assignee: France Telecom, Paris (FR)

( * ) Notice: Subject to any disclaimer, the term of this patent is extended or adjusted under 35 U.S.C. 154(b) by 387 days.

(21) Appl. No.: 12/996,406

(22) PCT Filed: Jun. 16, 2009

(86) PCT No.: PCT/FR2009/051146
§ 371 (c)(1),
(2), (4) Date: Dec. 6, 2010

(87) PCT Pub. No.: WO2010/004155
PCT Pub. Date: Jan. 14, 2010

(65) Prior Publication Data

US 2011/0106543 A1 May 5, 2011

(30) Foreign Application Priority Data

Jun. 26, 2008 (FR) ..................................... 08 54282

(51) Int. Cl.
*G01L 21/00* (2013.01)
*G01L 19/02* (2013.01)
*G01L 19/00* (2013.01)

(52) U.S. Cl.
USPC ............................ 704/205; 704/203; 704/201

(58) Field of Classification Search
USPC ............. 704/203, 204, 205, 501, 502; 381/17
See application file for complete search history.

(56) References Cited

U.S. PATENT DOCUMENTS 5,835,375 A * 11/1998 Kitamura ........................ 700/94
5,974,380 A * 10/1999 Smyth et al. .................. 704/229
6,005,946 A * 12/1999 Varga et al. ...................... 381/17
6,199,039 B1 * 3/2001 Chen et al. ..................... 704/229
7,006,636 B2 * 2/2006 Baumgarte et al. ............. 381/17

FOREIGN PATENT DOCUMENTS

WO WO 03/090206 A1 10/2003

OTHER PUBLICATIONS

Breebaart et al., "Parametric Coding of Stereo Audio," EURASIP Journal on Applied Signal Processing, 2005:9, pp. 1305-1322 (Jun. 1, 2005).
Breebaart et al., "Background, Concept, and Architecture for the Recent MPEG Surround Standard on Multichannel Audio Compression," Journal of the Audio Engineering Society, Audio Engineering Society, New York, NY, US, vol. 55(5), pp. 331-351 (May 1, 2007).

* cited by examiner

*Primary Examiner* — Jesse Pullias
(74) *Attorney, Agent, or Firm* — Drinker Biddle & Reath LLP

(57) ABSTRACT

A method and associated device are provided for spatial synthesis of a sum signal to obtain at least two output signals, the sum signal as well as the spatialization parameters being output from a parametric coding by matrixing of an original multi-channel signal. The method comprises: decorrelation of the sum signal to obtain a decorrelated signal; applying a synthesis matrix, whose coefficients depend on the spatialization parameters, to the decorrelated signal and to the sum signal to obtain said output signals, wherein for at least one range of value of at least one spatialization parameter, the coefficients of the synthesis matrix are determined according to a criterion of minimizing a quantitative function, relating to the quantity of decorrelated signal in each of the output signals obtained by applying the synthesis matrix.

12 Claims, 7 Drawing Sheets

SPATIAL SYNTHESIS OF MULTICHANNEL AUDIO SIGNALS

CROSS-REFERENCE TO RELATED APPLICATIONS

This application is the U.S. national phase of the International Patent Application No. PCT/FR2009/051146 filed Jun. 16, 2009, which claims the benefit of French Application No. 08 54282 filed Jun. 26, 2008, the entire content of which is incorporated herein by reference.

FIELD OF THE INVENTION

The present invention pertains to the field of the coding/decoding of multichannel digital audio signals.

More particularly, the present invention pertains to the parametric coding/decoding of multichannel audio signals.

BACKGROUND

This type of coding/decoding is based on the extraction of spatialization parameters so that on decoding, the listener's spatial perception can be reconstituted.

Such a coding technique is known by the English name "Binaural Cue Coding" (BCC) which is on the one hand aimed at extracting and then coding the auditory spatialization indices and on the other hand at coding a monophonic or stereophonic signal arising from a matrixing of the original multi-channel signal.

This parametric approach is a low-throughput coding. The main benefit of this coding approach is to allow a better compression rate than the conventional procedures for compressing multichannel digital audio signals while ensuring the retrocompatibility of the compressed format obtained with the coding formats and the broadcasting systems that already exist.

Thus, the invention relates more particularly to the spatial decoding of a 3 D sound scene on the basis of a reduced number of transmitted channels. The MPEG Surround standard described in the document of the MPEG standard ISO/IEC 23003-1:2007 and in the document by "Breebaart, J. and Hotho, G. and Koppens, J. and Schuijers, E. and Oomen, W. and van de Par, S.," entitled "Background, concept, and architecture for the recent MPEG surround standard on multichannel audio compression" in Journal of the Audio Engineering Society 55-5 (2007) 331-351, describes a specific structure for coding/decoding the multi-channel audio signal.

FIG. 1 describes such a coding/decoding system in which the encoder 100 constructs a sum signal ("downmix" in English) $S_s$ by matrixing (at 110) channels of the original multi-channel signal S and provides via a parameters extraction module 120, a reduced set of parameters P which characterize the spatial content of the original multi-channel signal.

At the decoder 150, the multichannel signal is reconstructed (S') by a synthesis module 160 which takes into account at one and the same time the sum signal and the parameters P transmitted.

The sum signal comprises a reduced number of channels. These channels may be coded by a conventional audio coder before transmission or storage. Typically, the sum signal comprises two channels and is compatible with a conventional stereo broadcast. Before transmission or storage, this sum signal can thus be coded by any conventional stereo coder. The signal thus coded is then compatible with the devices comprising the corresponding decoder which reconstruct the sum signal while ignoring the spatial data.

The MPEG Surround standard has adopted a specific structure for representing the spatial data: the coder relies on a tree-like coding structure constructed on the basis of a reduced number of elementary coding blocks each making it possible to extract spatial parameters on a reduced number of channels. There are two elementary types of coding block:

- TTO (for "Two To One" in English) blocks which make it possible to extract the spatial parameters between two channels and to construct a monophonic sum signal on the basis of these two channels,
- TTT (for "Three To Two" in English) blocks which make it possible to extract the spatial parameters between three channels and to construct a sum signal containing two channels on the basis of these three channels.

FIG. 2 illustrates a first example of a coding structure or coding tree using TTO blocks ($TTO_0$, $TTO_1$, $TTO_2$, $TTO_3$ and $TTO_4$) to obtain a monophonic signal S on the basis of a 5.1 multi-channel signal comprising 6 channels (L, R, C, LFE, Ls and Rs).

FIG. 3 illustrates a second exemplary coding structure using at one and the same time TTO blocks and TTT blocks to obtain a stereophonic signal Sl and Sr on the basis of the 5.1 signal.

The decoding of the monophonic or stereophonic signals thus received is performed by using a decoding tree symmetric with those represented in FIGS. 2 and 3.

Thus, for the decoding of a signal encoded according to the tree of FIG. 2, the decoding may be seen as a succession of reconstruction step.

In this case the first decoding step consists in reconstructing the signals corresponding to the input signals of block $TTO_0$ on the basis of the sum signal S and of the spatial parameters extracted by block $TTO_0$, the following step then consists in reconstructing the signals corresponding to the input signals of block $TTO_1$ on the basis of the signal reconstructed in the previous step and of the spatial parameters extracted by block $TTO_1$, the decoding thereafter continues in a similar manner until the reconstruction of all the channels of the coded multi-channel signal. In practice, the decoder constructs a matrix making it possible to pass directly from the monophonic sum signal to the 6 channels reconstructed by combination of the matrices of smaller size of the various TTO and TTT blocks.

However, the technique adopted in the MPEG Surround standard for decoding the TTO blocks imposes a very penalizing limitation for the coding of multichannel signals comprising channels in phase opposition.

This decoding technique is more precisely described in the patent application entitled "signal synthesizing" published under the number WO 03/090206 A1 on 30 Oct. 2003 (Applicant: Koninklijke Philips Electronics N.V., Inventor: Dirk J. Breebaart).

This technique consists, as represented with reference to FIG. 4, in performing a decorrelation step at 410 by filtering the sum signal s to obtain a decorrelated signal d. The sum signal and the decorrelated signal thus obtained are thereafter processed by a synthesis module 420 via a synthesis matrix M, as a function of the spatial parameters R and I so as to create the two signals l and r complying with the specified spatial parameters. The parameters R and I are here respectively the energy ratio between the channels of the multichannel signal and an interchannel correlation index for the channels of the multi-channel signal. The matrixing of the signals s and d is done according to the following relations:

$$\begin{bmatrix} l \\ r \end{bmatrix} = \begin{bmatrix} \lambda_1\cos(\alpha+\beta) & \lambda_1\sin(\alpha+\beta) \\ \lambda_2\cos(-\alpha+\beta) & \lambda_2\sin(-\alpha+\beta) \end{bmatrix} \begin{bmatrix} s \\ d \end{bmatrix} \quad (1)$$

with $$\lambda_1 = \sqrt{\frac{R}{1+R}},$$

$$\lambda_2 = \sqrt{\frac{1}{1+R}},$$

$$\alpha = \frac{1}{2}\arccos(I)$$

and $$\beta = \arctan\left(\frac{\lambda_2-\lambda_1}{\lambda_2+\lambda_1}\tan(\alpha)\right).$$

Now, this matrixing exhibits the limitation mentioned hereinabove and which renders this procedure unsuited to the coding of multichannel audio signals exhibiting negative interchannel correlations.

In particular, such a technique is not suited to the decoding of ambiophonic signals which comprise phase oppositions between channels.

Indeed, when the interchannel correlation I is negative, and in particular when it is close to −1, the proportion of decorrelated signal that is used to synthesize the signals l and r becomes very significant, sharply exceeding in certain typical cases the quantity of sum signal s used. In the most problematic case, it may be noted that for an interchannel difference of level of 0 dB, that is to say for R=1, when the interchannel correlation I tends to −1, the mixing matrix tends to the following matrix:

$$\begin{bmatrix} 0 & \frac{\sqrt{2}}{2} \\ 0 & -\frac{\sqrt{2}}{2} \end{bmatrix}. \quad (2)$$

This matrix corresponds to reconstructed signals $$l = \frac{\sqrt{2}}{2}d$$

and $$r = -\frac{\sqrt{2}}{2}d$$

which do not involve the sum signal in their expression, but use solely the decorrelated signal. Thus, the waveform of the reconstructed signal is not controlled since it depends totally on the decorrelation undergone by the signal s.

The reconstruction problem illustrated in the previous example in an extreme case also arises for other values of R and I, and is all the more marked the closer I is to −1. Thus, the waveform of the reconstructed channels is not in these cases as close as it could be to the original signals, thereby unnecessarily limiting the quality of the reconstructed signals.

The effect of this limitation is still more marked when the signal exhibits several channels having interchannel correlations close to −1. In this case, more than two channels have close waveforms, but some of them are in phase opposition.

During restitution of the original multi-channel signal, the signals of these various channels which have close waveforms will interact in the restitution zone, creating constructive and destructive interference which will make it possible to reconstruct the desired sound field.

After decoding, the waveform of the channels will be highly deformed because of the problem alluded to previously.

Moreover as each TTO block decoder involved in the decoding tree uses a different decorrelation filter, the deformation of the waveform will not be the same for the various channels.

The reconstructed channels then no longer have, as in the original signal, close waveforms and the interference which allowed the reconstruction of the sound field during restitution then no longer occurs as in the original signal. This culminates on the one hand in poor spatial reconstruction of the sound scene, and on the other hand in the creation of audible artifacts, the differences in waveform giving rise to the creation of perceptible noisy components.

SUMMARY

The present invention aims to improve the situation.

For this purpose, the present invention proposes a method for spatially synthesizing a sum signal to obtain at least two output signals, the sum signal together with spatialization parameters being output by a parametric coding by matrixing of an original multi-channel signal. The method comprises the steps of:

- decorrelation of the sum signal to obtain a decorrelated signal;
- application of a synthesis matrix whose coefficients depend on the spatialization parameters, to the decorrelated signal and to the sum signal so as to obtain said output signals, characterized in that for at least one value range of at least one spatialization parameter, the coefficients of the synthesis matrix are determined according to a criterion for minimizing a quantitative function (q), relating to the quantity of decorrelated signal in each of the output signals obtained by the step of applying the synthesis matrix.

Thus, by taking account of the quantity of decorrelated signal in each of the signals and therefore in the step of synthesizing the signal, it is possible to circumvent the typical case mentioned previously where only the decorrelated signal is involved in the synthesis matrixing. The method according to the invention thus makes it possible to deal with the cases where a spatialization parameter situated in a predetermined value range gives rise to such a situation.

In a particular embodiment, the quantitative function is such that the increase in absolute value of the coefficients of the synthesis matrix that are applied to the decorrelated signal increases the value of said function applied to these same coefficients.

Minimization of such a quantitative function makes it possible to define coefficients of the synthesis matrix which make it possible to ensure good compliance with the waveform of the input signal in the output signals.

More particularly and in a simple manner, such a quantitative function may be an energy function of the decorrelated signal.

This function complies well with the characteristics mentioned previously.

In a more general manner, the quantitative function is of the type:

$$q(x, y) = (|x|^p + |y|^p)^{\frac{1}{p}}$$

with p an integer greater than or equal to 1.

In a particular embodiment, the spatialization parameters are a parameter (R) of energy ratio between the channels of the multi-channel signal and a parameter (I) of interchannel correlation of the multi-channel signal, a value range being the range in which the interchannel correlation parameter is negative.

Thus, the invention applies more particularly in respect of multi-channel signals exhibiting negative interchannel correlations.

It may therefore be implemented solely for negative values of the interchannel correlation parameter or for any value of this parameter.

In another embodiment, a different quantitative function is chosen per value range of the spatialization parameters.

It is then possible to modulate the relative significance that it is desired to give to the various synthesis matrices. It is thus possible to give a significant weight to a matrix such as defined in the state of the art, for a particular range of parameters and conversely to give a significant weight to the synthesis matrix within the meaning of the invention for another parameter range. Thus, it is possible to preserve compatibility with the existing systems in a certain operating range and to improve the quality of the system in a particular range. Moreover, the possibility of using several synthesis matrices obtained according to various criteria makes it possible to optimize the global quality of the system for the whole of the operating range.

The invention also pertains to a device for spatially synthesizing a sum signal generating at least two output signals, the sum signal together with spatialization parameters being output by a parametric coding device implementing a matrixing of an original multi-channel signal. The device comprising:

- means (510) for decorrelating the sum signal to obtain a decorrelated signal;
- means (520) for applying a synthesis matrix (M Minq) whose coefficients depend on the spatialization parameters, to the decorrelated signal and to the sum signal so as to obtain said output signals, characterized in that for at least one value range of at least one spatialization parameter, the coefficients of the synthesis matrix are determined according to a criterion for minimizing a quantitative function, relating to the quantity of decorrelated signal in each of the output signals obtained by the means for applying the synthesis matrix.

It pertains to a decoder comprising a synthesis device such as described hereinabove.

The invention is also aimed at a multimedia appliance comprising a decoder such as described hereinabove.

In a nonlimiting manner, such an appliance may for example be a mobile telephone, an electronic diary or digital content reader, a computer, a lounge decoder ("set-top box").

Finally, the invention is aimed at a computer program comprising code instructions for the implementation of the steps of the method such as described hereinabove, when these instructions are executed by a processor.

BRIEF DESCRIPTION OF THE DRAWINGS

Other characteristics and advantages of the invention will be more clearly apparent on reading the following description, given solely by way of nonlimiting example and with reference to the appended drawings in which.

DETAILED DESCRIPTION

Figure 1:
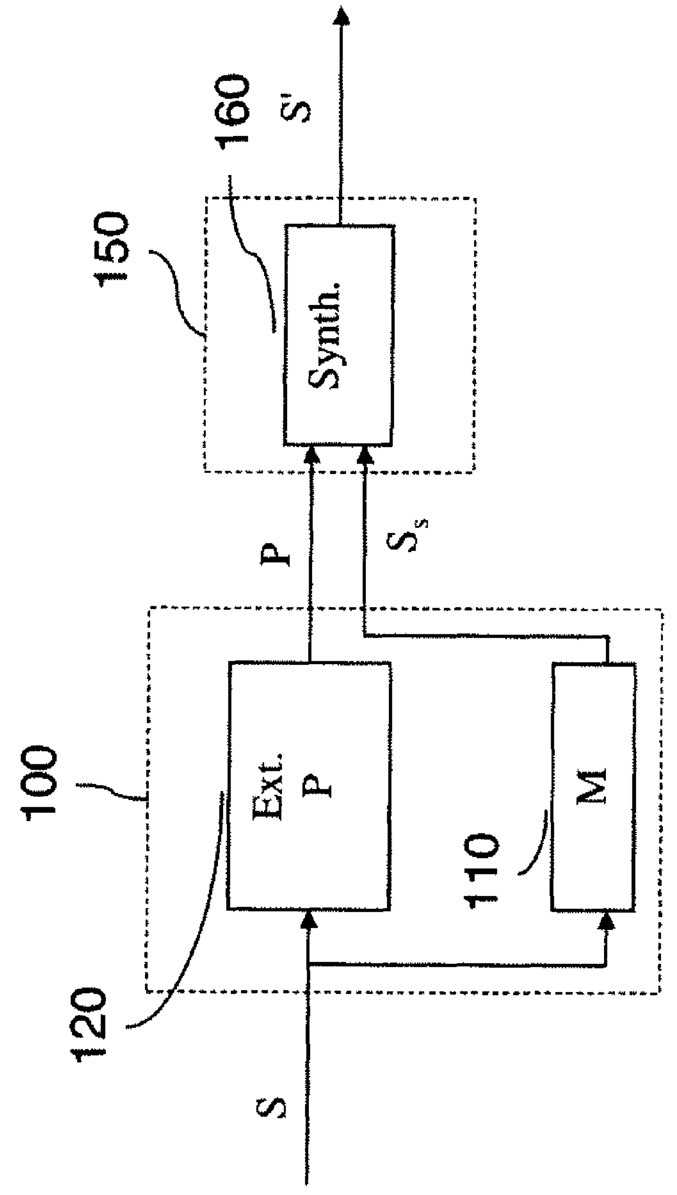
Fig.1 (Prior art)
FIG. 1 illustrates a conventional parametric coding/decoding system of the state of the art such as described previously.
Figure 3:
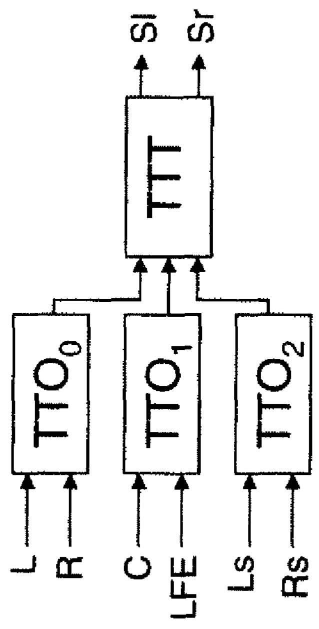
FIGS. 2 and 3 illustrate examples of coding trees such as described previously, according to the MPEG Surround standard in the case of a multi-channel signal of 5.1 type.
Figure 2:
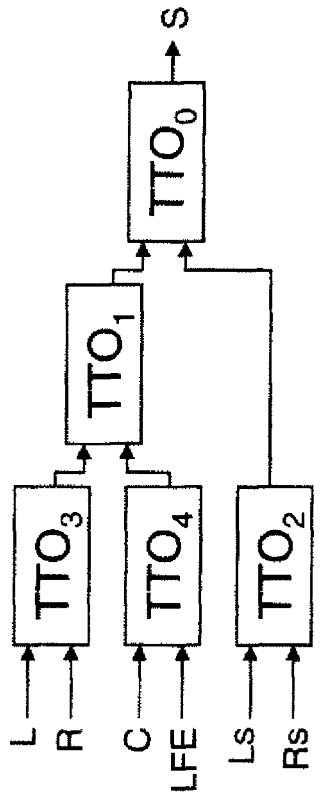
Figure 4:
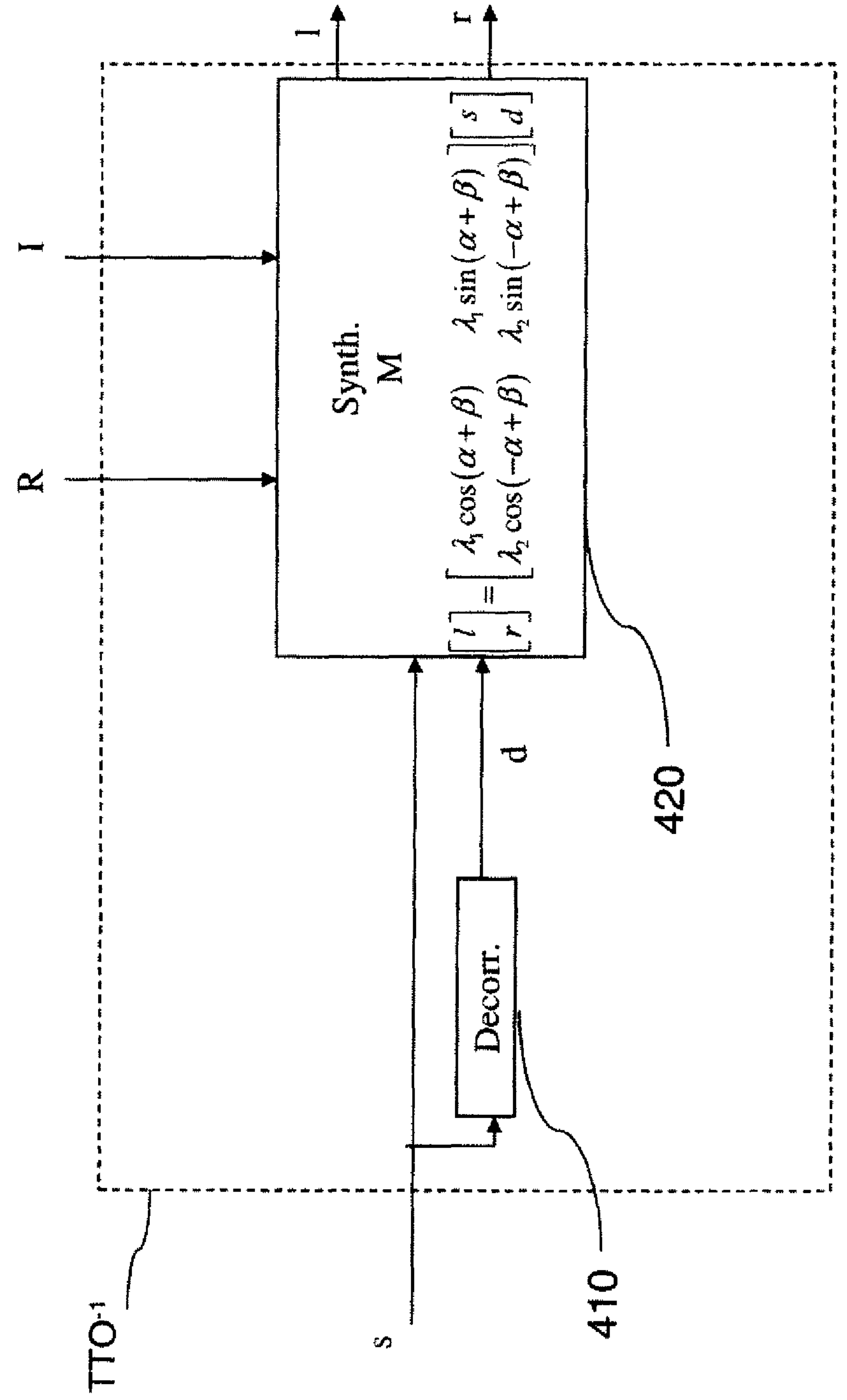
Fig.4 (Prior art)
FIG. 4 illustrates a state of the art decoding system for a TTO block such as described previously.
Figure 5:
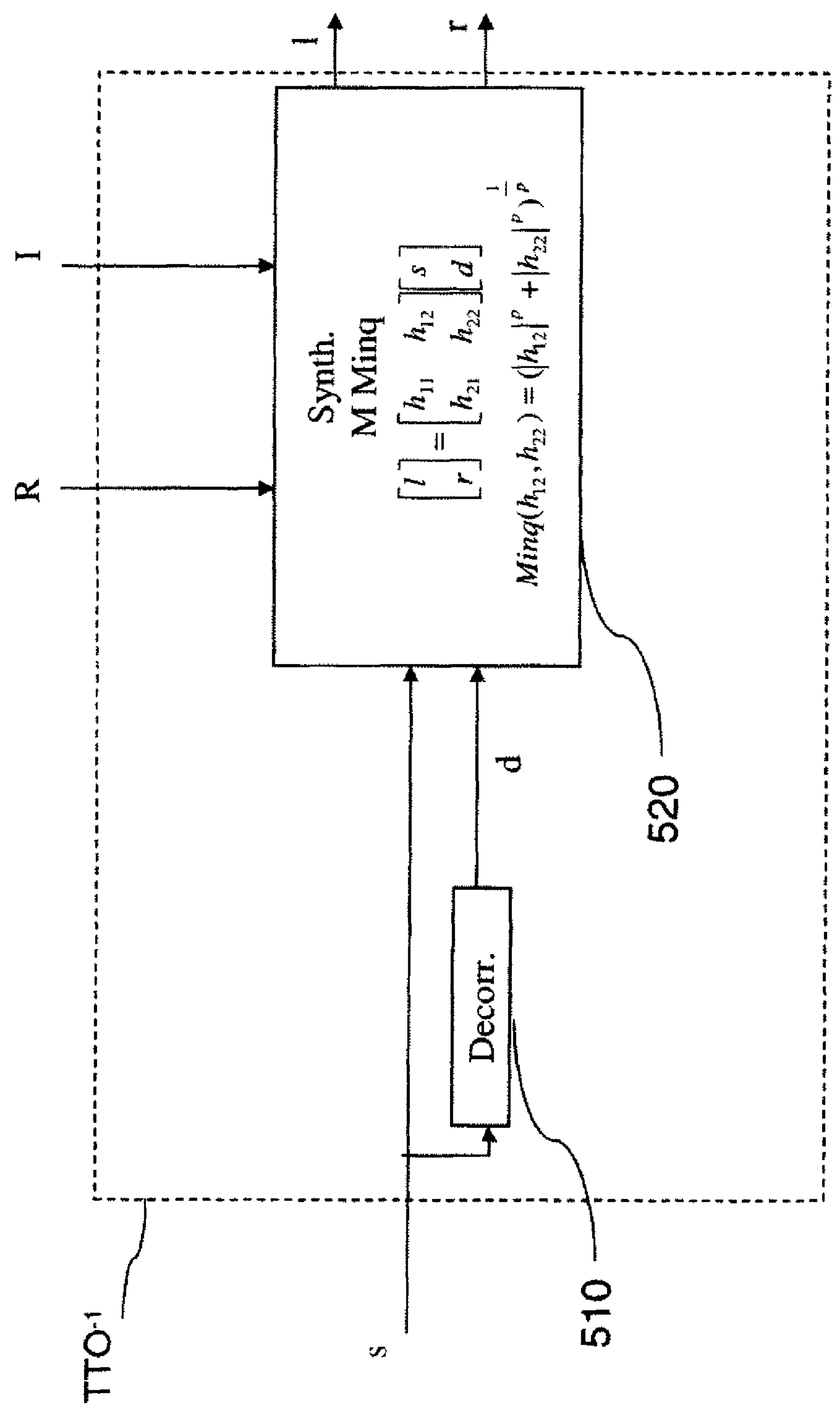
FIG. 5 illustrates a synthesis device according to the invention for the decoding of a TTO block.

FIG. 5 illustrates an embodiment of the invention. It illustrates a synthesis device for the decoding of a TTO block ($TTO^{-1}$). This device comprises a decorrelation module 510, able to perform a step of decorrelating the signal received which is a sum signal obtained on coding by a matrixing of multichannel signals.

This decorrelation step is for example that described in the MPEG Surround standard cited previously.

This decorrelated signal d and the sum signal s are taken into account in a synthesis module 520 using a matrix M Minq whose coefficients depend on spatialization parameters R and I received and producing output signals l and r.

More precisely, the signals l and r are generated by the following matrixing:

$$\begin{bmatrix} l \\ r \end{bmatrix} = \begin{bmatrix} h_{11} & h_{12} \\ h_{21} & h_{22} \end{bmatrix} \begin{bmatrix} s \\ d \end{bmatrix} \tag{3}$$

while complying with the following conditions:

the total energy is preserved, that is to say:

$$h_{11}^2+h_{12}^2+h_{21}^2+h_{22}^2=1 \tag{4}$$

the energy ratio between l and r equals R, that is to say:

$$h_{11}^2+h_{12}^2=R(h_{21}^2+h_{22}^2) \tag{5}$$

the normalized intercorrelation between l and r equals I, that is to say:

$$\frac{h_{11}h_{21} + h_{12}h_{22}}{\sqrt{(h_{11}^2 + h_{12}^2)(h_{21}^2 + h_{22}^2)}} = I \tag{6}$$

Using the first two conditions, we have $$h_{11}^2 + h_{12}^2 = \frac{R}{R+1} \text{ and } h_{21}^2 + h_{22}^2 = \frac{1}{R+1} \tag{7}$$

The solutions can therefore be written in the form:

$$h_{11}=\sqrt{\frac{R}{R+1}}\cos(a),\quad h_{12}=\sqrt{\frac{R}{R+1}}\sin(a),\quad h_{21}=\sqrt{\frac{1}{R+1}}\cos(b),\quad h_{22}=\sqrt{\frac{1}{R+1}}\sin(b) \tag{8}$$

The third condition may then be written:

$$\cos(a)\cos(b)+\sin(a)\sin(b)=I \tag{9}$$

that is to say cos(a−b)=I.

It is therefore seen that the solution matrices for the problem are the set of matrices parameterized by $\beta\in[0,2\pi)$ of the form:

$$\begin{bmatrix} h_{11} & h_{12} \\ h_{21} & h_{22} \end{bmatrix} = \begin{bmatrix} \sqrt{\frac{R}{R+1}} & 0 \\ 0 & \sqrt{\frac{1}{R+1}} \end{bmatrix} \begin{bmatrix} \cos(\beta+\alpha) & \sin(\beta+\alpha) \\ \cos(\beta-\alpha) & \sin(\beta-\alpha) \end{bmatrix} \tag{10}$$

with $$\alpha = \pm\frac{\arccos(I)}{2}.$$

Thus, two values of α are possible. The value of β is dependent on R and I and is chosen according to an embodiment of the invention so as to limit the quantity of the decorrelated signal d introduced into the reconstructed signals whatever the correlation values I, including for negative values.

Thus, the choice of the value β may be formalized by introducing a quantitative function q relating to the quantity of decorrelated signal taken into account in the matrixing for the reconstruction of the signals.

In a general manner, the quantitative function q is such that the increase in absolute value of the coefficients of the synthesis matrix that are applied to the decorrelated signal increases the value of the function q applied to these same coefficients.

Thus, this quantitative function q is such that it satisfies the following conditions:

for all reals x, x', y if |x'|≥|x| then q(x',y)≥q(x,y)

and symmetrically for all reals x, y, y' if |y'|≥|y| then q(x,y')≥q(x,y).

For I and R fixed, the value of β is then chosen by minimizing the function:

$$f(\beta)=q(h_{12},h_{22})=q\left(\sqrt{\frac{R}{R+1}}\sin(\beta+\alpha),\ \sqrt{\frac{1}{R+1}}\sin(\beta-\alpha)\right) \tag{11}$$

Numerous quantitative functions complying with the conditions described hereinabove may be chosen and will make it possible to make a satisfactory choice for β.

Thus, the function q may for example be of type:

$$q(x,y)=(|x|^p+|y|^p)^{\frac{1}{p}} \tag{12}$$

with p an integer greater than or equal to 1.

In a particular embodiment, the quantitative function q is an energy function of the decorrelated signal.

The function q is therefore such that:

$$q(x,y)=x^2+y^2 \tag{13}$$

Thus, the values of β guaranteeing satisfactory reconstruction according to the here-described embodiment of the invention are chosen so as to minimize the total energy of the decorrelated signal d in the reconstructed signals.

We then seek β minimizing:

$$h_{12}^2+h_{22}^2=\frac{R}{R+1}\sin^2(\beta+\alpha)+\frac{1}{R+1}\sin^2(\beta-\alpha) \tag{14}$$

that is to say $$h_{12}^2+h_{22}^2=\frac{1}{2}\left(\frac{R}{R+1}(1-\cos(2\beta+2\alpha))+\frac{1}{R+1}(1-\cos(2\beta-2\alpha))\right) \tag{15}$$

this amounting to maximizing:

$$g(\beta)=\frac{R}{R+1}\cos(2\beta+2\alpha)+\frac{1}{R+1}\cos(2\beta-2\alpha) \tag{16}$$

The derivative of g is:

$$g'(\beta)=-2\left(\frac{R}{R+1}\sin(2\beta+2\alpha)+\frac{1}{R+1}\sin(2\beta-2\alpha)\right) \tag{17}$$

$$g'(\beta)=-2\left(\frac{R-1}{R+1}\sin(2\alpha)\cos(2\beta)+\frac{R+1}{R+1}\cos(2\alpha)\sin(2\beta)\right) \tag{18}$$

It vanishes when:

$$\tan(2\beta)=\frac{1-R}{R+1}\tan(2\alpha) \tag{19}$$

The value of β adopted is therefore chosen from among the values satisfying $$\beta=\frac{1}{2}\arctan\left(\frac{1-R}{R+1}\tan(2\alpha)\right)\bmod\left(\frac{\pi}{2}\right)$$

and corresponding indeed to a maximum value of g.

Thus, FIG. 5 represents a synthesis device for decoding a TTO block, here called $TTO^{-1}$, comprising a module 510 for decorrelating the sum signal and a synthesis module 520 able to apply a synthesis matrix to the decorrelated signal and to the sum signal. The coefficients of this synthesis matrix are determined according to a criterion for minimizing a quantitative function q relating to the quantity of decorrelated signal such as described hereinabove.

FIG. 5 also illustrates the steps of the spatial synthesis method according to the invention in which at least two output signals l and r are obtained on the basis of a sum signal s. The sum signal is output from a parametric coding by matrixing of a multi-channel signal also providing spatialization parameters.

The method implemented by the synthesis device comprises the steps of:

decorrelation (Decorr.) of the sum signal to obtain a decorrelated signal d;

application (Synth.) of a synthesis matrix (M Minq) whose coefficients depend on the spatialization parameters (I, R), to the decorrelated signal (d) and to the sum signal (s) to obtain said output signals.

This method is such that for at least one value range of at least one spatialization parameter, the coefficients of the synthesis matrix are determined according to a criterion for minimizing a quantitative function, relating to the quantity of decorrelated signal taken into account in the step of applying the synthesis matrix.

In the embodiment described previously with reference to FIG. 5, the spatialization parameters are parameters designating the energy ratio R between the channels of the original multi-channel signal and a measure of interchannel correlation of this same signal.

Other spatialization parameters output by the parametric coding can also be chosen. These parameters can for example be parameters designating the phase shift between the channels of the multi-channel signal, or parameters of temporal envelope of the audio channels.

Figure 6:
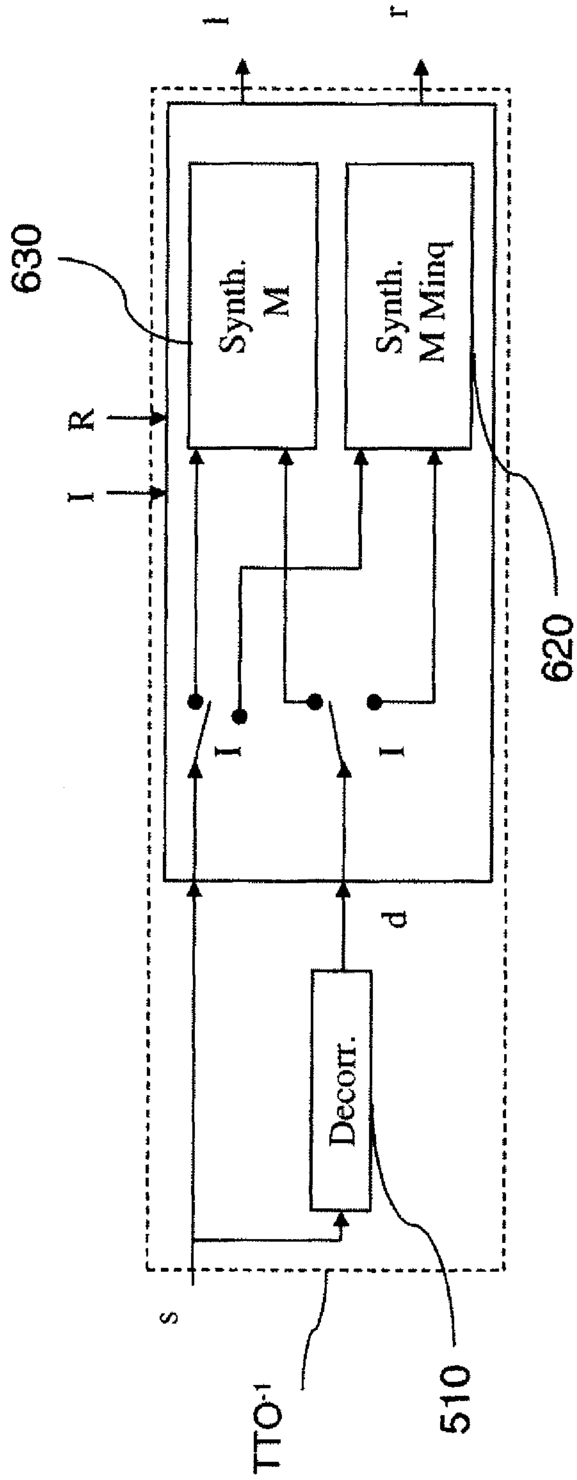
FIG. 6 illustrates a synthesis device for the decoding of a TTO block according to a particular embodiment.

FIG. 6 illustrates another embodiment of the invention in which, as a function of a value range of at least one of the spatialization parameters received, here the interchannel correlation parameter I, a different synthesis matrix is chosen.

The example illustrated in FIG. 6 shows two types of synthesis matrix.

The first synthesis matrix M is for example that described in the state of the art in the MPEG Surround standard. The corresponding synthesis module is illustrated at 630. This synthesis matrix is applied here to the sum signal s and to the decorrelated signal d when the parameter I is positive.

When the parameter I is negative, the synthesis matrix M Minq is that described with reference to FIG. 5. The corresponding synthesis module is represented at 620.

Thus, the method implemented by this embodiment makes it possible to effectively process multi-channel signals which exhibit negative interchannel correlations.

This type of multi-channel signal is for example a signal of ambiophonic type. Indeed, this type of signal exhibits channels in phase opposition. This characteristic element of the signals arising from an ambiophonic sound pick-up is illustrated in the articles by M. Gerzon entitled "Hierarchical System of Surround Sound Transmission for HDTV" or "Ambisonic Decoders for HDTV".

In a variant embodiment, several synthesis matrices may be provided for different ranges of values of the spatialization parameters.

Thus, it is possible to modulate the relative significance that it is desired to give to the various synthesis matrices as a function of the values of parameters received.

For example, it is thus possible to give a significant weight to a matrix M such as described in the state of the art for a particular range of parameters and conversely to give a significant weight to the synthesis matrix MMinq within the meaning of the invention for another parameter range.

Compatibility with the existing systems in a certain operating range is then preserved. An improvement in the quality of the synthesis in a particular value range of spatialization parameters is then afforded in this embodiment.

Moreover, the possibility of using several synthesis matrices obtained according to various criteria makes it possible to optimize the global quality of the synthesis for the whole of the operating range.

It is for example possible to use various synthesis matrices depending on whether the value of at least one spatialization parameter is low or on the contrary significant.

Thus in this variant of the embodiment, two synthesis matrices will be used, such that for positive values of the correlation index I, the matrix M such as described in the state of the art will be used, and for negative values of the correlation index I, the matrix MMinq will be used.

It will also be possible to define various operating ranges such as for example:

for $I>0$, a matrix Minter=M is used for $0\geq I>-0.25$, an interpolation of the two matrices Minter=$\alpha$M+(1−$\alpha$) MMinq will be used for $-0.25\geq I>-1$, the matrix Minter=MMinq will be used This type of device $TTO^{-1}$ such as represented in FIG. 5 or in FIG. 6 is for example integrated into a digital signal decoder. Such a type of decoder is for example illustrated with reference to FIG. 7.

The decoder represented in this figure is typically provided for decoding multi-channel signals of 5.1 type. Thus, this decoder comprises a plurality of devices $TTO^{-1}$ ($TTO_0^{-1}$, $TTO_1^{-1}$, $TTO_2^{-1}$, $TTO_3^{-1}$, $TTO_4^{-1}$) according to the invention for, on the basis of a signal S received, obtaining a multi-channel signal comprising 6 channels (L, R, C, LFE, Ls, Rs).

The decoding module 730 comprising this plurality of synthesis devices can, quite obviously, be configured in a different manner according to the coding tree which was used for the original multi-channel signal.

Figure 7:
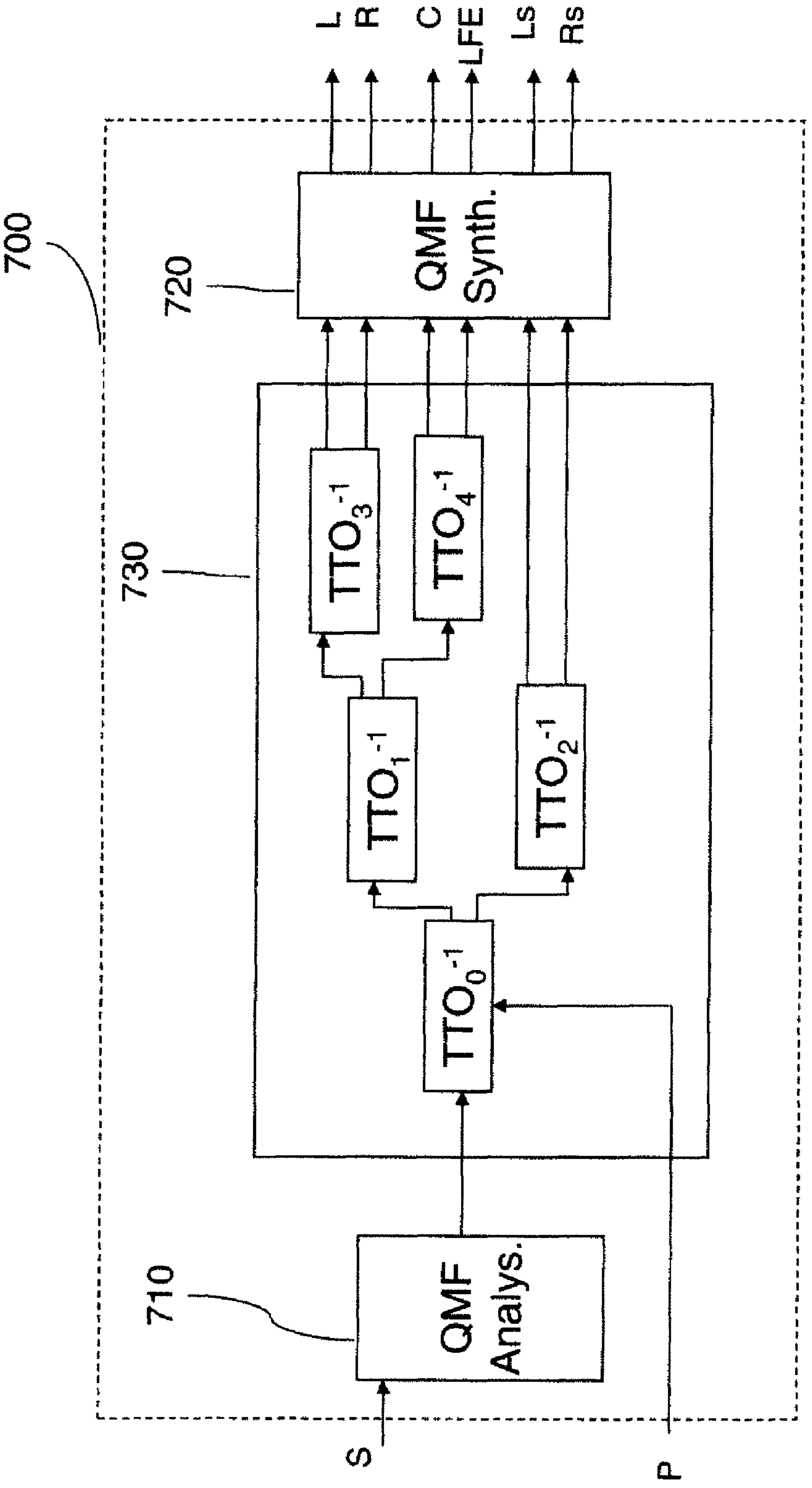
FIG. 7 illustrates a decoder according to the invention in the case of multichannel signals of 5.1 type.

The decoder such as represented in FIG. 7 comprises an analysis module QMF (for "Quadrature Mirror Filter" in English) able to perform a transformation of the sum temporal signal (or downmix) S arising from the coder into a sub-band-based frequency signal. The frequency band-based signal is then provided as input to the decoding module 730. On output from the decoding module, the processed signals enter the QMF synthesis module 720 able to perform an inverse transformation and return the multi-channel signal obtained to the temporal domain.

These QMF analysis and QMF synthesis modules can for example be those such as described in the MPEG Surround standard.

The decoder such as represented in FIG. 7 receives spatialization parameters P from the coder which arise from the parametric coding of the original multi-channel signal.

Typically, these parameters may be parameters of interchannel energy ratio, of inter-channel correlation measurement or else of inter-channel phase shift or finally of temporal envelope.

This decoder 700 may be integrated into a multimedia appliance such as a lounge decoder or "set-top box", computer or else mobile telephone, digital content reader, personal electronic diary, etc.

Figure 8:
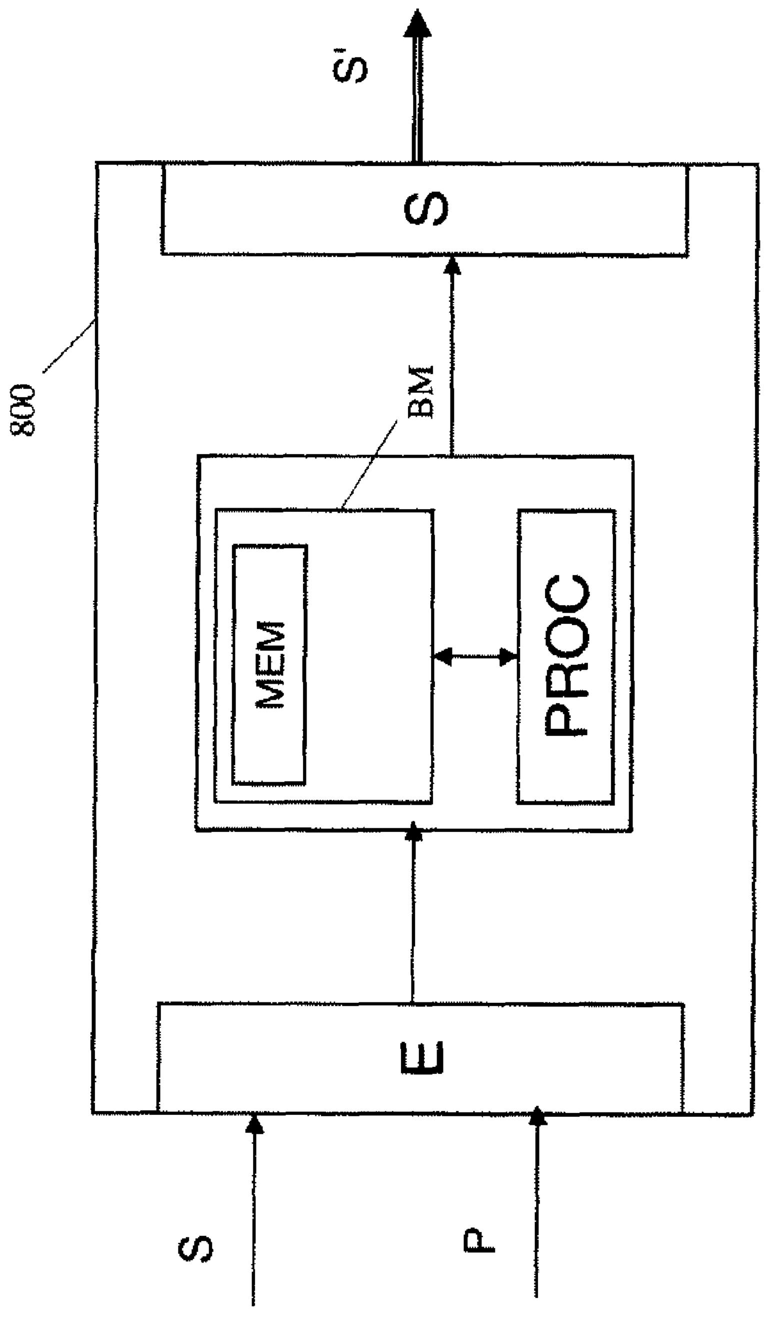
FIG. 8 illustrates an exemplary multimedia appliance comprising at least one synthesis device according to the invention.

FIG. 8 represents an example of such a multimedia appliance which comprises in particular an input module E able to receive multi-channel sound signals compressed either by a communication network for example or by way of a multi-channel sound pick-up.

These multi-channel signals have been compressed by a parametric coding procedure which by matrixing of the original signal generates a sum signal S and spatialization parameters P. This coding can in an alternative mode be provided in the multimedia appliance.

This appliance comprises one or more synthesis devices according to the invention represented in hardware terms here by a processor PROC cooperating with a memory block BM comprising a storage and/or work memory MEM.

The memory block can advantageously comprise a computer program comprising code instructions for the implementation of the steps of the method within the meaning of the invention, when these instructions are executed by the processor PROC, and in particular a step of decorrelating a sum signal received so as to obtain a decorrelated signal and a step of applying a synthesis matrix whose coefficients depend on the spatialization parameters, to the decorrelated signal and to the sum signal so as to obtain at least two output signals. The synthesis matrix is such that, for at least one value range of at least one spatialization parameter, its coefficients are determined according to a criterion for minimizing a quantitative function, relating to the quantity of decorrelated signal taken into account in the step of applying the synthesis matrix.

Typically, the description of FIG. 5 employs the steps of an algorithm of a computer program such as this. The computer program can also be stored on a memory support readable by a reader of the device or downloadable to the memory space of the appliance.

The memory block thus comprises the coefficients of the synthesis matrix such as is defined hereinabove.

This memory block can comprise in another embodiment of the invention such as described with reference to FIG. 6, coefficients defining several synthesis matrices which are applied to the sum signal and to the decorrelated signal as a function of the range of values of the spatialization parameters received.

Likewise the processor of the appliance can also comprise instructions for the implementation of the steps of analysis and synthesis of the decoder such as is described with reference to FIG. 7.

The multimedia appliance such as illustrated also comprises an output S for delivering the reconstructed multi-channel signal S' either by restitution means of loudspeaker type or by communication means able to transmit this multi-channel signal.

The invention claimed is:

1. A method implemented in an audio signal decoder for spatially synthesizing a downmix signal to obtain at least two output signals, the downmix signal together with spatialization parameters being output by a parametric coding by matrixing of an original multi-channel signal, the method comprising the steps, executed by a processor of the audio signal decoder, of:

decorrelating the downmix signal to obtain a decorrelated signal;

applying a synthesis matrix whose coefficients depend on the spatialization parameters, to the decorrelated signal and to the downmix signal so as to obtain said output signals, wherein for at least one value range of at least one spatialization parameter, the coefficients of the synthesis matrix are determined according to a criterion for minimizing a quantitative function, relating to the quantity of decorrelated signal in each of the output signals obtained by the step of applying the synthesis matrix, wherein the quantitative function is such that the increase in absolute value of the coefficients of the synthesis matrix that are applied to the decorrelated signal increases the value of said function applied to these same coefficients.

2. The method as claimed in claim 1, wherein the quantitative function is an energy function of the decorrelated signal.

3. The method as claimed in claim 1, wherein the quantitative function is of the type:

$$q(x, y) = (|x|^p + |y|^p)^{\frac{1}{p}}$$

with p an integer greater than or equal to 1.

4. The method as claimed in claim 1, wherein the spatialization parameters are a parameter of energy ratio between the channels of the multi-channel signal and a parameter of interchannel correlation of the multi-channel signal, a value range being the range in which the interchannel correlation parameter is negative.

5. The method as claimed in claim 1, wherein a different quantitative function is chosen per value range of the spatialization parameters.

6. The method as claimed in claim 1, wherein the quantitative function satisfies the following conditions:

for all reals x, x', y if |x'|≥|x| then q(x',y)≥q(x,y) and symmetrically for all reals x, y, y' if |y'|≥|y| then q(x,y')≥q(x,y).

7. A device for spatially synthesizing a downmix signal generating at least two output signals, the downmix signal together with spatialization parameters being output by a parametric coding device implementing a matrixing of an original multi-channel signal, the device comprising means for:

decorrelating the downmix signal to obtain a decorrelated signal;

applying a synthesis matrix whose coefficients depend on the spatialization parameters, to the decorrelated signal and to the downmix signal so as to obtain said output signals, wherein for at least one value range of at least one spatialization parameter, the coefficients of the synthesis matrix are determined according to a criterion for minimizing a quantitative function, relating to the quantity of decorrelated signal in each of the output signals obtained by the means for applying the synthesis matrix, wherein the quantitative function is such that the increase in absolute value of the coefficients of the synthesis matrix that are applied to the decorrelated signal increases the value of said function applied to these same coefficients.

8. A digital audio signal decoder comprising at least one synthesis device as claimed in claim 7.

9. A multimedia apparatus comprising a decoder as claimed in claim 8.

10. A non-transitory computer readable storage medium having a computer program recorded thereon, said computer program comprising code instructions for the implementation of the steps of the method as claimed in claim 1, when executed by a processor of a digital audio decoder.

11. A method implemented in an audio signal decoder for spatially synthesizing a downmix signal to obtain at least two output signals, the downmix signal together with spatialization parameters being output by a parametric coding by matrixing of an original multi-channel signal, the method comprising the steps, executed by a processor of the audio signal decoder, of:

decorrelating the downmix signal to obtain a decorrelated signal;

applying a synthesis matrix whose coefficients depend on the spatialization parameters, to the decorrelated signal and to the downmix signal so as to obtain said output signals, wherein for at least a first range of value of a spatialization parameter, a first synthesis matrix is applied and for at least a second range of value of the spatialization parameter, a second synthesis matrix is applied, the coefficients of the second synthesis matrix being determined according to a criterion for minimizing a quantitative function, relating to the quantity of decorrelated signal in each of the output signals obtained by applying the synthesis matrix.

12. The method as claimed in claim 11, wherein the quantitative function satisfies the following conditions:

for all reals x, x', y if $|x'|\geq|x|$ then $q(x',y)\geq q(x,y)$ and symmetrically for all reals x, y, y' if $|y'|\geq|y|$ then $q(x,y')\geq q(x,y)$.

* * * * *